E. HOPKINSON.
TIRE CARRYING RIM.
APPLICATION FILED OCT. 14, 1911.
1,238,769.
Patented Sept. 4, 1917.
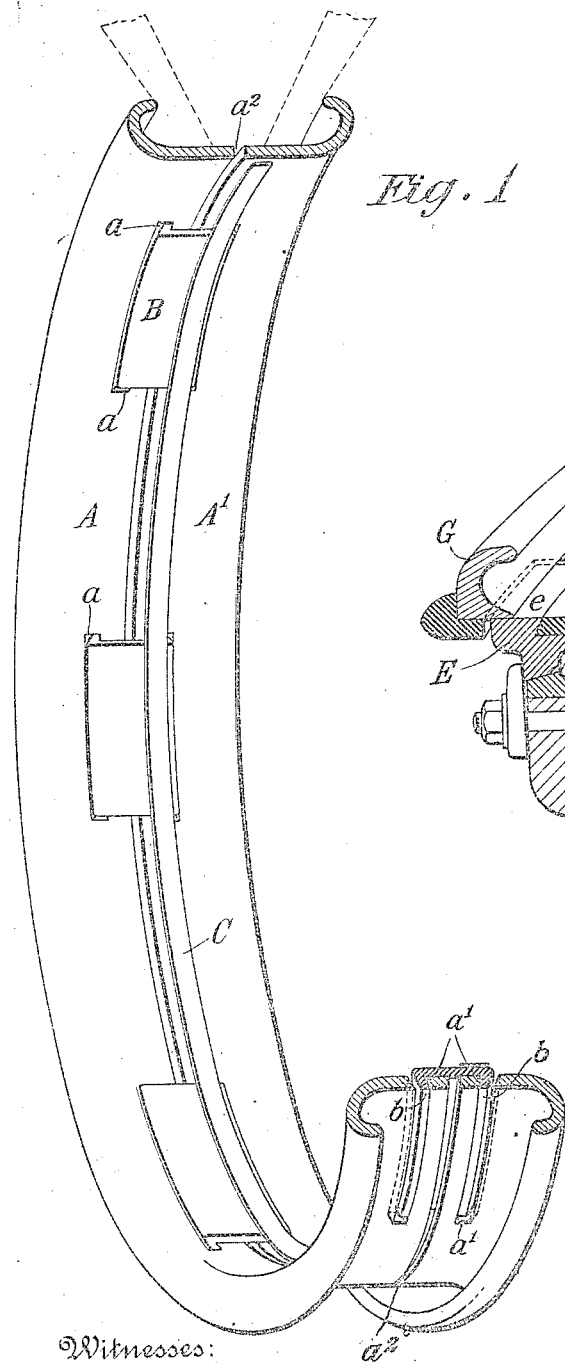
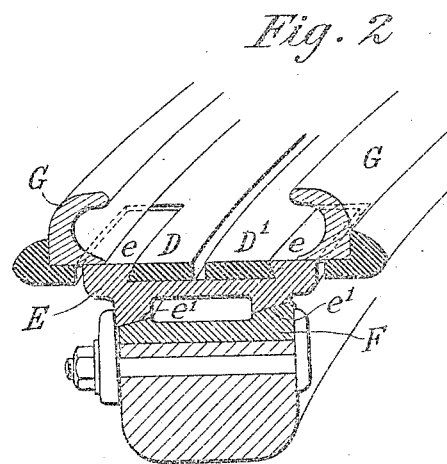
Fig. 1
Fig. 2
Witnesses:
B. V. Mohan
Anna Berger
Inventor
Ernest Hopkinson

UNITED STATES PATENT OFFICE.

ERNEST HOPKINSON, OF EAST ORANGE, NEW JERSEY.

TIRE-CARRYING RIM.

1,238,769.

Specification of Letters Patent.   Patented Sept. 4, 1917.

Application filed October 14, 1911.   Serial No. 654,587.

*To all whom it may concern:*

Be it known that I, ERNEST HOPKINSON, a citizen of the United States of America, residing at East Orange, New Jersey, have invented a certain new and useful Tire-Carrying Rim, of which the following is a specification.

The present invention relates to tire-carrying rims, by which is meant a rim designed to carry a pneumatic tire for a vehicle wheel in inflated condition while disassociated from the wheel. In other words, it is what is known in the art as a "demountable rim."

The object of the invention is to provide a rim of the kind described, which shall be cheap of manufacture and safe, and easy to assemble and take apart.

In the drawings, I have illustrated a construction embodying my invention in which Figure 1 is an arbitrary view, partly in cross-section and partly in perspective.

Fig. 2 is a view similar to Fig. 1, but showing a modification.

Like letters of reference refer to like parts in the several views of the drawings.

Referring to the drawings in detail, and, particularly to Fig. 1, the rim is circumferentially divided into two members A and A'. Each of these members is provided with a plurality of slots $a$. The surface of these slots nearest the central circumferential line of the rim, is inclined, as at $a'$, to engage a corespondingly undercut flange on the coupling pieces, to be hereinafter described.

Each of the coupling pieces, referred to, consists of a base portion B, provided with two undercut flanges $b$. The location of the slots in the rim members, and the width of the coupling pieces are preferably such that they will be covered by the edge of the tire shoe, when the rim is associated with its tire.

I prefer to connect all the coupling pieces by a spring metal band C, which I have shown in the drawings as being narrow, and located only under one of the rim members, as A'. This metal band will be of quite light metal, so as to be easy of manipulation, and may be endless or may simply consist of a strip of metal made of such a length that when it is placed in position with the series of coupling pieces, its ends will abut against some suitable projection or against each other.

In Fig. 2, I have shown a modification, in which the same principle is embodied. In this modification, the rim is circumferentially divided into two rim members D and D'. The rim members are provided with slots similar to the construction illustrated in Fig. 1, and the coupling pieces E are provided with undercut flanges $e$ engaging slots in the rim members. This form of coupling piece is also provided with wedging portions, having inclined surfaces $e'$, contacting with similarly shaped inclines on the felly band F. Any form of device for securing the tire-carrying rim to the felly band may be employed, those shown in the drawings being the usual bolt and nut construction, which, as they do not form a part of this invention, and are well known in the art, are not necessary of detailed description. This construction affords a simple and cheap construction for securing a rim to the felly band, as the coupling piece carrying the wedging surface may be drawn in long lengths and then cut to proper sectional length, and curved to the desired arc or may be cast or drop-forged.

It will be understood that this modification is intended for use as a "universal rim," that is, a rim, which may be used either with a clencher hook tire, or, a tire having straight sides at its edges, the usual reversible tire flanges being used for this purpose, and are designated in the drawings by the letter G.

The method of operation is as follows:—

Referring particularly to Fig. 1, the coupling pieces connected to the metal band C are placed in position engaging the rim member A'. The tire is then placed in position on said rim member A'. The rim member A is then engaged with the other clencher hook of the tire and moved toward the other rim member. This will bring its inner edge in contact with the disengaged flanges of the coupling pieces, which will be tilted toward the center of the rim, yet kept in contact with the inner surface of the rim member until the slots come to register with the disengaged flanges on the coupling pieces, which will take place when the rim member A is substantially in contact with the rim member A', when the flanges of the coupling pieces under the spring action of the metal band will snap into engagement with the slots.

A central circumferential space $a^2$ is provided between the rim members, so as to make it possible for the undercut flanges of the coupling pieces B to enter the slots in the rim member, this central circumferential space compensating for the inclination on the inner surface of the slots in the rim members. Upon releasing pressure on the rim member A, the internal pressure or tendency of the tire to gape at its edges will cause the inclined inner surface of the slots to lock with the undercut flanges of the coupling pieces. This locking engagement will be maintained and enhanced as the tire is inflated. So long as the internal pressure is maintained in the tire, it is impossible for the parts to become disassociated. The inner tube of an automobile tire is provided with a valve stem, having a "spreader," which impinges against the inner surfaces of the edges of the tire shoe and acts as a wedge to force the edges of the tire shoe apart, mechanically holding them in position against the side flanges, the spreader exerting its wedging action by being drawn down by a suitable screw on the valve stem, acting on the under surface of the rim. This spreader will keep the rim members apart, independent of inflation, and will prevent the rim members moving during the period the rim may be in use on a wheel after puncture and before the automobile comes to rest. It may be necessary to have mechanical wedges at other points of the rim, but as these wedges, if necessary at all, constitute a minor detail, it is not deemed necessary to make further description here. The operation above described is substantially the same with regard to the construction in Fig. 2, except that no metal band is here shown. This may or may not be employed and may vary in size and location from that shown in the drawing. Of course, other variations may be made in the details and construction illustrated, without departing from the spirit of the invention.

What is claimed as new is:

1. A tire-carrying rim divided longitudinally into two similar members having marginal tire retaining portions, whose combined interior width when forced together is less than the normal outside width of the corresponding fastening portions of a tire when inflated thereon and said members are separated, and a plurality of integral coupling pieces having undercut ends adapted to engage corresponding edges formed on the interior of said rim members to hold said members normally spaced apart against lateral pressure of the tire when inflated and capable of removal only when the rim members are moved toward each other.

2. A tire-carrying rim divided longitudinally into two similar members having marginal tire retaining portions, each of which is provided with a plurality of slots, the combined interior width of said members when forced together being less than the normal outside width of the corresponding fastening portions of a tire when inflated thereon and said members are separated, and a plurality of integral coupling pieces having undercut ends adapted to engage the edges of opposed slots in the rim members to hold said members normally spaced apart against the lateral pressure of a tire when inflated and capable of removal only when the rim members are moved toward each other.

3. In combination with a longitudinally divided tire rim having coupling-engaging means on the inner sides of the sections thereof, inextensible coupling members adapted to engage said means when said sections are normally separated by the inflation of a tire, and a resilient band connecting said coupling members and adapted to hold the same temporarily in position prior to the inflation of the tire.

4. In combination with a longitudinally divided tire rim having coupling-engaging means on the inner sides of the sections thereof, inextensible hooked coupling members adapted to engage said means when said sections are normally separated by the inflation of a tire, and a resilient band connecting said coupling members and adapted to hold the same temporarily in position prior to the inflation of the tire.

5. In combination with a longitudinally divided tire rim having slots in the cylindrical portions thereof, inextensible hooked coupling members adapted to engage the inner edges of said slots when said sections are normally separated by the inflation of a tire, and a resilient band connecting said coupling members and adapted to hold the same temporarily in position prior to the inflation of the tire.

In witness whereof, I affix my signature in the presence of two witnesses.

ERNEST HOPKINSON.

Witnesses:
ANNA BERGER,
B. V. MOHAN.